July 28, 1931.  F. G. BEETEM  1,816,038
ELECTROLYTIC RECTIFIER
Filed March 1, 1926
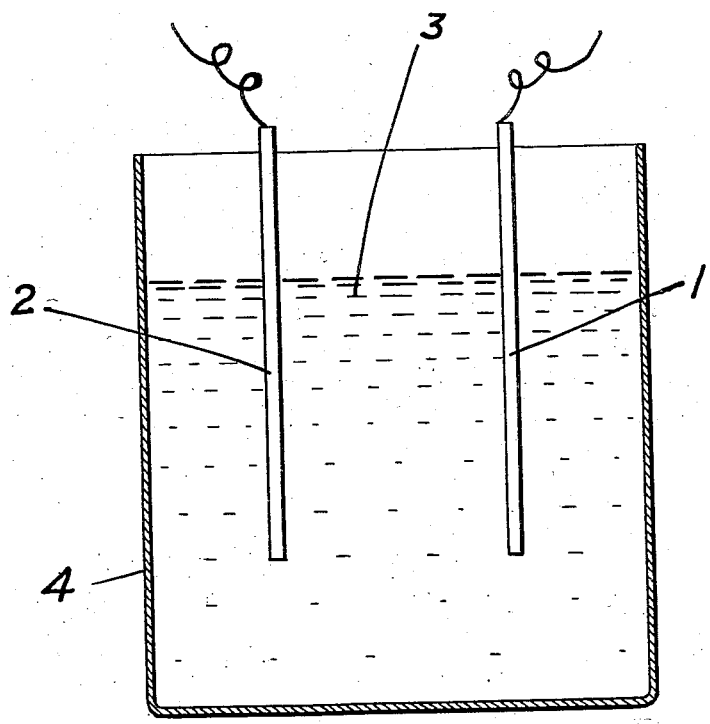
WITNESS:
Rob. R. Kitchel.
INVENTOR
Frank G. Beetem
BY
Augustus B. S. Houghton
ATTORNEY.

Patented July 28, 1931

1,816,038

UNITED STATES PATENT OFFICE

FRANK G. BEETEM, OF PHILADELPHIA, PENNSYLVANIA

ELECTROLYTIC RECTIFIER

Application filed March 1, 1926. Serial No. 91,653.

My invention relates to electrolytic rectifiers, and its object is to provide an electrolyte for such rectifiers, and especially for those in which metallic aluminum is employed as one of the electrodes, which shall prolong the life of the electrode, reduce the heating and increase the output of the rectifier as compared with electrolytes heretofore employed.

The single figure of the accompanying drawing illustrates a conventional electrolytic cell.

In the drawing 1 is an electrode of metallic aluminum. For the electrode 2 a non-film forming metal may be used. An example is lead antimony alloy. 3 is the electrolyte and 4 the jar.

In the preferred form of my electrolyte I use an aqueous solution or admixture of mono-ammonium phosphate, dibasic potassium phosphate and citric acid. I find that very satisfactory results are obtained when these substances are used in the following proportions: 3 parts by weight of mono-ammonium phosphate, 6 parts by weight of dibasic potassium phosphate, 16 parts by weight of citric acid, 75 parts by weight of water.

However, considerable variation may be made in the proportions in which the three substances cited above are used, and excellent results may be obtained by using less of the citric acid and by varying the relation between the ammonium and the potassium phosphates. I do not, therefore, wish my invention to be limited to the exact proportions cited above.

Citric acid is an example of those organic acids which form soluble compounds with aluminum when subjected to current in an electrolytic cell.

I claim:

1. An electrolyte for an electrolytic rectifier comprising a fluid admixture of water, mono-ammonium phosphate, di-basic potassium phosphate and citric acid.

2. An electrolyte for an electrolytic rectifier, comprising an admixture of water, and one part of mono-ammonium phosphate to approximately two parts of di-basic potassium phosphate and at least one part of citric acid.

FRANK G. BEETEM.